United States Patent Office 3,574,811
Patented Apr. 13, 1971

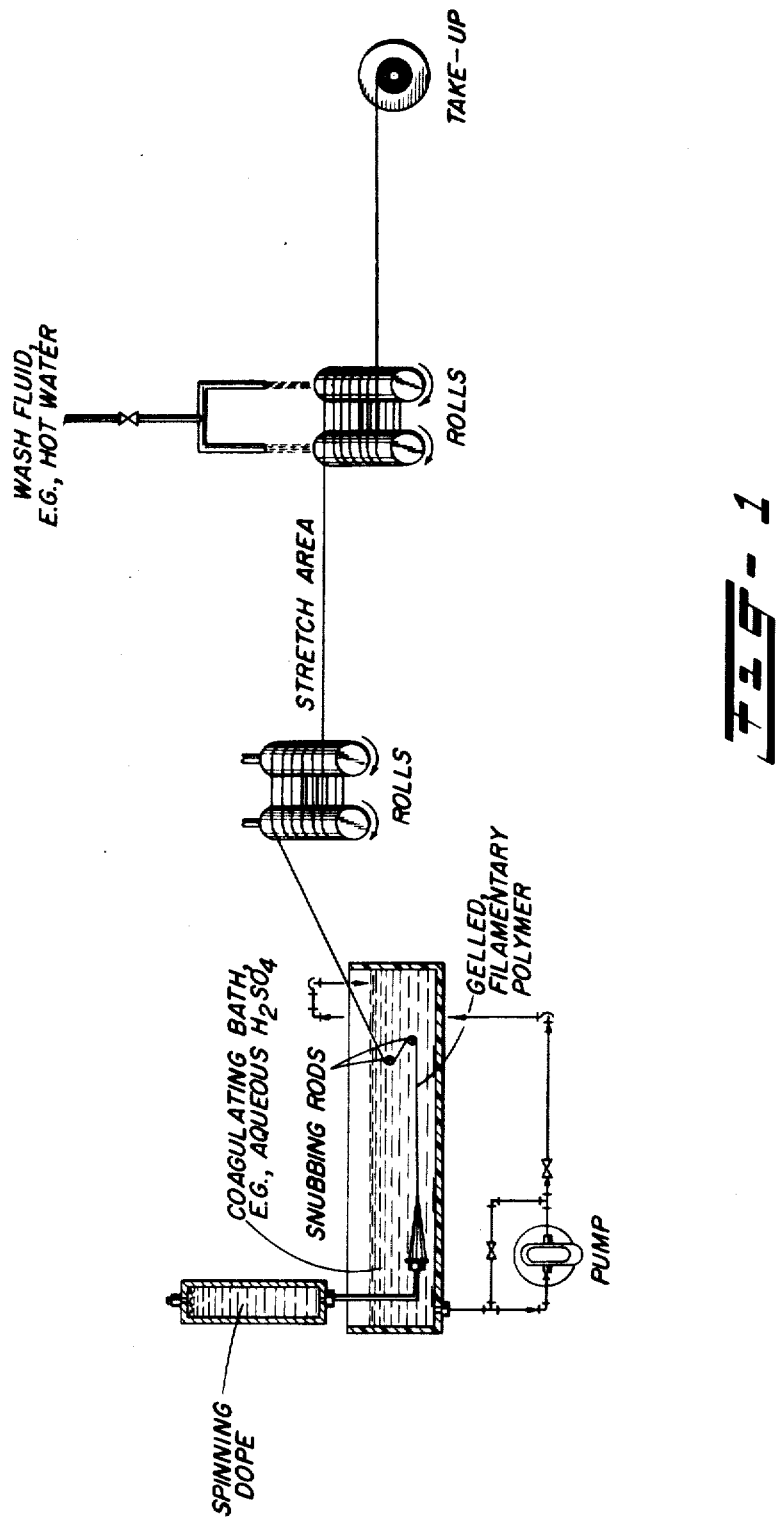

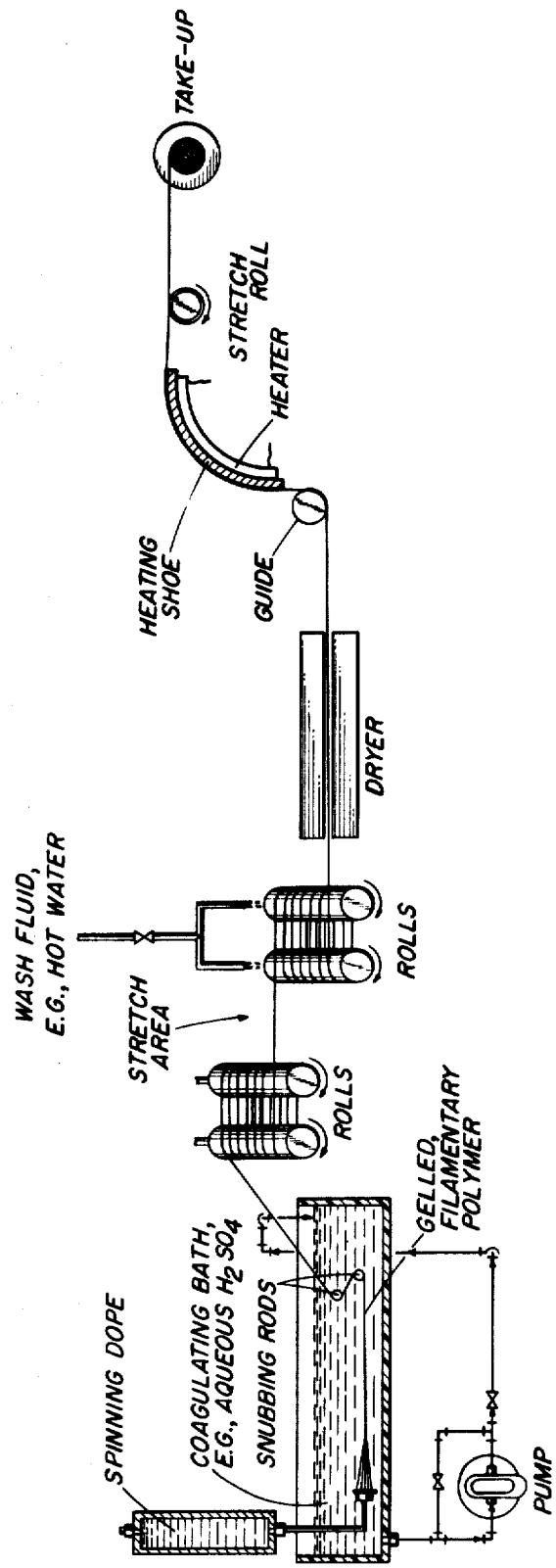

1

3,574,811
POLYAMIDE WET-SPINNING AND STRETCHING PROCESS
Saunders E. Jamison, Summit, N.J., assignor to Celanese Corporation, New York, N.Y.
Continuation of application Ser. No. 507,472, Nov. 12, 1965. This application Oct. 8, 1969, Ser. No. 866,120
Int. Cl. D01d *5/06, 5/16;* D01f *7/04*
U.S. Cl. 264—184                    10 Claims

ABSTRACT OF THE DISCLOSURE

A method of increasing the tenacity of wet-formed shaped structures such as filaments and films of filament and film forming condensation polymers of difficultly meltable condensation polymers such as polycarbonomides, polyurethanes and polyureas wherein the polymer is extruded as a solution in a solvent into a coagulation bath. The tenacity is favorably increased by snubbing the extruded polymer in the coagulation bath to tension the same and further orientating the structure in the wet state by stretching it outside of the coagulation bath to a total draw of about 1.5 to 3.5X prior to drying the gelled structure. Particularly disclosed are polyhexamethylene adipamide, which may be further hot drawn 1.1 to 2.5X at 100 to 210° C., and polyhexamethylene terephthalamide, which may be further hot drawn 1.05 to 1.5X at 270 to 350° C.

---

This application is a streamlined continuation of application Ser. No. 507,472 filed Nov. 12, 1965.

This invention relates broadly to the art of producing shaped articles such as filaments, films and the like. More particularly it is concerned with a wet-forming method of producing such articles from synthetic, wet-formable polymers, especially fiber- and/or film-forming (-formable) condensation polymers having nitrogen and/or oxygen atoms, and preferably both nitrogen and oxygen atoms, as an integral part of the polymer chain.

In accordance with one embodiment of the present invention there is provided a method of preparing high-tenacity, wet-spun nylon fibers, e.g., fibers of poly(hexamethylene adipamide), which includes the steps of wet-spinning a solution of the polymer into a liquid coagulating bath, e.g., an aqueous sulfuric acid coagulating bath containing less than about 18% by weight of $H_2SO_4$, to form a gelled filamentary material; effecting partial molecular orientation of the gelled filaments in the bath by means of tension against frictional resistance, e.g., by "snubbing" the said filaments over a pair of ceramic rods or pins; and, after withdrawing the filamentary material from the bath, effecting further molecular orientation of the gelled filaments by stretching in air between rolls revolving at different peripheral speeds. Optionally, further increase in molecular orientation with resulting increase in fiber tenacity can be obtained by subsequent stretching of the dried filaments over a heated surface, e.g., a hot "shoe" or pin.

This invention is advantageously employed in forming filaments (both mono- and multifilaments) and other shaped elongated articles of continuous length, from polymers having a molecular weight that is excessive for the requirements of melt-spinning, e.g., polymers having an inherent viscosity (I.V.) in excess of about 1.5. However, as shown in certain of the following examples the method of the invention is also applicable in forming shaped articles from condensation polymers having an I.V. materially below 1.5, e.g., about 1.2.

The technique of the instant invention may also be practiced in producing shaped articles from wet-formable,

2 difficultly-meltable condensation polymers having nitrogen and/or oxygen atoms as an integral part of the polymer chain. More specific examples of such condensation polymers are the high-melting polycarbonamides, particularly those melting above 275° C. such as polyhexamethylene terephthalamide and by which is meant poly(hexamethylene terephthalamide). In wet-spinning these difficultly-meltable polymers into, for example, a sulfuric acid coagulating bath, the concentration of $H_2SO_4$ in the coagulating bath may be below 18% (i.e., the same as employed in coagulating nylon filaments such as the aforementioned polymeric hexamethylene adipamide), but preferable the $H_2SO_4$ concentration is substantially above 18%, e.g., 40 to 50%.

By "difficultly-meltable" polymers, as the term is used herein, are meant polymers that cannot be shaped easily using melt-extrusion techniques because they tend to degrade materially and/or to polymerize further to a useless, infusible mass when heated sufficiently to melt them.

It was known prior to the present invention that difficultly-meltable condensation polymers could be wet-formed into shaped articles, specifically filaments or fibers. See, for example, U.S. Pats. 3,154,512 and- 612 of Parczewski; 3,154,609—Cipriani; 3,154,610—Denyes; and 3,154,613—Epstein et al., each dated Oct. 27, 1964; and 3,179,618—Roberts, dated Apr. 20, 1965.

In the aforementioned Patents 3,154,609, 3,154,610 and 3,154,613 it is disclosed that difficultly-meltable polymers can be dissolved in sulfuric acid containing at least 75% by weight of $H_2SO_4$ and that the resulting solution can be extruded through an opening of predetermined cross-section having at least one thin dimension into a liquid coagulating or spin bath of aqueous sulfuric acid having an acid concentration lower than that of the sulfuric acid in which the polymer was dissolved and such that the filamentary material is coagulated into a shaped article, e.g., a filamentary material, in gel state.

In my copending joint application with John W. Soehngen, Ser. No. 481,587, filed Aug. 23, 1965, which is directed to the production of shaped filamentary and other articles having improved dyeability by wet-forming a difficultly-meltable polymer, it is disclosed that the molecules of the gelled article, e.g., filamentary material, may be oriented along the fiber axis either by snubbing means positioned in the coagulating bath or, alternatively, by means of stretch rolls located outside the said bath. The invention is primarily concerned with means for activating the aqueous sulfuric acid contained in the shaped article whereby the dyeability of the washed and dried article is increased.

The aforementioned Cipriani Patent 3,154,609 also discloses that stretching of undried filaments (i.e., gelled filaments) spun from a polymer of the kind exemplified by polyhexamethylene terephthalamide "may be carried out in the spin bath or after removing the filaments from the spin bath." Stretching in the spin bath may be effected by snubbing. "Alternatively," Cipriani states, "the wet filaments may be taken up by a first godet roll and subsequently by a second roll traveling at a speed greater than that of the first roll." There is no disclosure or suggestion in this Cipriani patent of the method of this invention and which involves a combination of snubbing in the spin bath and stretching between rolls outside the said bath.

All of the aforementioned copending applications and patents are assigned to the same assignee as the present invention.

By practicing the present invention as briefly described in the second and third paragraphs of this specification, nylon polymers such as nylon 6,6 (i.e., polyhexamethylene adipamide) that do not meet the requirements for melt-spinning because, for example, of excessive molecular weight and/or poor color may be converted (specifically by wet-spinning) into filamentary materials of adequate physical properties (including tensile strength) for textile use. Furthermore, the invention provides means for converting difficultly-meltable, fiber-forming condensation polymers, e.g., those containing repeating amide groups as an integral part of the polymer chain, into filamentary materials having tensile strength ranging up to 6 and 7 grams per denier (g./d.) and sometimes even higher.

The novel features of my invention are set forth in the appended claims. The invention itself, however, will be most readily understood from the following description taken in connection with the accompanying drawing, which is illustrative of the invention, and wherein.

FIG. 1 illustrates schematically one embodiment of the invention; and

FIG. 2 illustrates schematically another embodiment of the invention.

THE POLYMERIC MATERIAL

Among the difficulty-meltable, wet-formable polymers to which the present invention is applicable are those fiber and/or thin-forming polymers having repeating =NCO— groups, more particularly —NRCO— groups where R represents hydrogen or a monovalent organic radical, e.g., a hydrocarbon radical such as a lower-alkyl radicals. Such polymers include the difficultly-meltable polyamides such as those wherein the —NRCO— groups are attached to carbon atoms on each side; the polyurethanes which contain repeating =NCOO— groups, more particularly —NRCOO— groups; the polyureas which contain repeating =NCON= groups, more particularly —RNCONR— groups; and similar condensation polymers.

Thus, the technique of the instant inpention is useful in preparing shaped articles formed of high-melting polymers, more particularly those melting above 210° C. and especially above 275° C.; polyurethanes and polyureas melting above 179° C., especially above 210° C.; and, in general, polymers having cyclic groups such as 1,4-cyclohexylene and/or heterocyclic groups such as piperazylene or an alkyl-substituted piperazylene group, e.g., 2-(lower-alkyl) piperazylene such as 2,6-dimethylpiperazylene, as an integral part of the polymer molecule.

Some contemplated polyamides are, for example, those having repeating structural units of the formula

—NR—Y—NR'—CO—Y'—CO— that result from the condensation of a dicarboxylic acid or a derivative thereof, e.g., a salt, acyl halide, or ester of such an acid, with a diamine, wherein the R's, which may be the same or different, are hydrogen or monovalent organic radicals, e.g., lower-alkyl radicals such as methyl or ethyl, and the Y's, which also may be the same or different, are divalent organic radicals such as alkylene, e.g., ethylene, tetramethylene or hexamethylene, arylene such as para- and meta-xylylene, and para- and meta-diethylenebenzene, cycloalkylene such as 1,4-cyclohexylene and divalent heterocyclic radicals such as those derived from piperazine, and monoalkyl- and dialkylpiperazines, e.g., 2-methyl- and 2,5-dimethyl-piperazines and 2-ethyl- and 2,5-diethylpiperazines, wherein the open bonds are attached to the nitrogen atoms, and wherein the chemical structure of the polymer and/or the polymerization technique used is such that a relatively high-melting polymer is obtained.

An important group of polyamides within the above group, and which may be shaped in accordance with this invention, includes those in which Y and/or Y' is or contains a para- or meta-phenylene radical or a 1,4-cyclohexylene radical. Particularly important are condensation products of a diamine and terephthalic acid or a derivative of terephthalic acid, e.g., terephthalyl chloride or a dialkyl terephthalate. Some specific polymers within this latter group are poly(polymethylene)terephthalamides wherein the polymethylene groups contain from 2 to 10 carbon atoms, inclusive, e.g., polyhexamethylene terephthalamide, polyoctamethylene terephthalamide, polytetramethylene terephthalamide, polyethylene terephthalamide, and polypiperazylene terephthalamide. Other polyterephthalamides are poly(o-, m-, and p-phenylene)terephthalamides, poly(o-, m-, and p-xylylene)terephthalamides and poly(o-, m-, and p-diethylenephenylene)terephthalamides, the latter produced, for example, by condensing an ester-forming derivative of terephthalic acid with para-bis(beta-aminoethyl)benzene.

The technique of this invention is applicable in the the production of filaments and other shaped articles of high-melting polyamides of aromatic acids other than terephthalic acid, e.g., of isophthalic acid, 2,6-naphthalenedicarboxylic acid, p,p'-dicarboxydiphenyl, (p,p'-dicarboxydiphenly)methane, phenylenediacetic acid, phenylenedipropionic acid and phenylenedibutyric acid. The diamine moieties of these other aromatic carboxylic acids may be the same as in the aforementioned polyterephthalamides. Illustrative, then, of polyamides other than the polyterephthalyamides are the polyisophthalamides, specifically polyethylene isophthalamide. The present invention also may be employed in making shaped bodies from high-melting polyamides resulting from a condensation reaction between (a) alkylene dicarboxylic acids such as adipic acid and (b) cyclic diamines such as p-xylene diamine and p-bis(amino-ethylbenzene).

Also contemplated is the use of high-melting, autocondensation polymers (e.g., those melting above 275° C.) of an aminocarboxylic acid or a lactam or other derivative of such an acid, which polymers have repeating structural units of the formula —NR—Y—CO— wherein R and Y are as defined above. Some specific polyamides melting above 275° C. within this group are polymers of the following: 1-carboxymethyl - 4 - aminocyclohexane or its lactam, 1-carboxy - 4 - aminocyclohexane or its lactam and 1-carboxymethyl - 3 - aminocyclopentane or its lactam.

Polyurethanes that may be shaped in accordance with this invention are polymers having repeating structural units of the formula

—NR—Y—NR'—CO—O—Y'—CO—O— and resulting, for example, from the condensation of a diisocyanate with a dihydric alcohol or phenol or the condensation of a diamine with a bis(chloroformate) of a dihydric alcohol or phenol, where the R's and Y's are as described above in connection with the polyamides, and the chemical structure of the polymer and/or the polymerization techniques used are such that a polymer melting above 179° C., preferably above 210° C., is obtained. Particularly useful in practicing this invention are polyurethanes prepared from dihydric alcohols or phenols containing a meta- or para-phenylene or a 1,4-cyclohexylene radical. Some specific polyurethanes which may be shaped are the condensation product of piperazine with the bis(chloroformate) of bis(p-hydroxyphenyl)-propane-2,2, the condensation product of piperazine with the bis(chloroformate) of hydroquinone and the condensation product of tetramethylene diamine with the bis(chloroformate) of butanediol-1,4, each of which has a melting point above 210° C.

Polyureas that may be wet-formed in accordance with this invention include those having repeating structural units of the formula

—CO—NR—Y—NR—CO—NR'—Y'—NR'— wherein the R's and Y's are as defined above. They may be synthesized, for example, by the addition of a diisocyanate to a diamine, the condensation of a diurethane with a diamine, the condensation of a carbon oxyhalide such as phosgene with a diamine, or by heating an alpha-beta-diurea with a diamine, the chemical structure of the polymer and/or the polymerization technique being such that a polymer melting above 179° C., preferably above 210° C., is obtained. Some specific polyureas that may be employed in practicing this invention are those obtained from the reaction of hexamethylene diisocyanate with hexamethylene diamine and from the reaction of m-phenylene diisocyanate with m-phenylene diamine, each of which polyurea melts above 210° C.

As previously has been pointed out melt-formable polymers including nylons that, for one reason or another, do not meet the requirements for melt-spinning may be wet-formed to yield useful textile and other shaped articles by the technique of the present invention. Such melt-formable polymers are synthetic linear polymers, more particularly linear condensation polymers, that is, linear polymers containing amide groups as an integral part of the main chain of atoms in the polymer molecule. Such polymers have sometimes been designated as superpolymers, e.g., superpolyamides. They may be made as described in, for instance, U.S. Patents 2,071,250; 2,071,253, 2,130,948, 2,251,508; 2,341,423; 2,876,524; 2,993,826; and in patents referred to in the aforesaid patents, as well as in many others. In some cases the nylons are produced from polyamide-forming reactants only. In other cases they are made from mixtures of reactants including, additionally, other reactants that form linear polymers.

There are several different types or kinds of melt-formable synthetic linear polyamides that can be used in practicing the present invention, particularly those having an I.V. of at least 1.2 and preferably at least about 1.5. One type is derived from polymerizable monoaminomonocarboxylic acids or their amide-forming derivatives. Another type is derived from suitable diamines by reaction with suitable dibasic carboxylic acids or their amide-forming derivatives. Another type, generally designated as interpolyamides, is derived from a mixture of polyamide-forming reactants capable of yielding more than one polyamide if reacted in suitable combination. Some of these linear polyamides may contain other groups, e.g., ester groups. Examples of polyamides containing both amide and ester groups are those prepared from adipic acid, hexamethylenediamine and a glycol, e.g., ethylene glycol, hexamethylene glycol, etc., or mixtures of different glycols.

More specific examples of nylons, in addition to the previously mentioned nylon 6,6, that normally are melt-formed but which may be wet-formed into filamentary and other shaped materials by the technique of the present invention are polyamides derived from epsilon-caprolactam (i.e., nylon 6); polytetramethylene adipamide; polydecamethylene adipamide; polytetramethylene sebacamide; polyhexamethylene sebacamide; polyamides of the amino-acid type, e.g., aminoundecanoic acid, etc.; and polyamides or interpolyamides containing, for example, azelaic acid and/or decamethylenediamine as ingredients.

For additional information concerning the composition of nylons useful in practicing the instant invention, reference is made to the prior patents and publications known to those skilled in the art including the patents specifically mentioned in the third paragraph immediately preceding.

The polymer-containing solvent solutions or dopes which are prepared and extruded to produce a shaped article are preferably made by dissolving the polymer in sulfuric acid containing at least 75%, more particularly at least 80%, by weight of $H_2SO_4$. Preferably, too, the sulfuric acid is concentrated sulfuric acid containing 95 to 100% by weight of $H_2SO_4$. Fuming sulfuric acid, e.g., such acid containing up to 6 or 7% by weight or even higher of free $SO_3$, also may be employed. A suitable concentration of polymer in the dope is in the range of, for example, from 5 to 30% by weight.

The use of solvents other than sulfuric acid is not precluded. For example, instead of employing sulfuric acid as a solvent, one may use a solvent containing over 85% by weight of phosphoric acid (see U.S. Pat. 3,154,612, supra); or a solvent comprising at least 70% by weight of antimony trichloride, and formic acid or acetic acid as a diluent in an amount up to 30% by weight of the solvent (see U.S. Pat. 3,154,512, supra).

The solutions are prepared by dissolving the finely divided polymer in the chosen solvent, preferably sulfuric acid in at least the minimum acid concentration previously mentioned. Mixing is generally effected at about 35° to about 55° or 60° C., and is continued until the polymer has substantially completely dissolved, e.g., for from 1 to 5 or 6 hours. Preferably there is also dissolved in the sulfuric acid solvent at least 1%, more particularly from 1 to 15%, based on the weight of the said solvent, of a salt that yields ions in solution that have an affinity for protons at least equal to bisulfate ions. Examples of such salts are the ammonium and alkali-metal sulfates and phosphates, including ammonium, sodium and potassium sulfates, diammonium phosphate and disodium phosphate. Other and more specific examples and the advantages of such additives are given in the aforementioned Epstein et al. Patent No. 3,154,613.

Before extruding the extrudable liquid composition it may be filtered if deemed necessary or desirable; usually, also, it is deaerated by any suitable means, e.g., by centrifuging. The temperature of this liquid composition or dope may range, for example, from ambient temperature to 100° C. immediately prior to extrusion through a shaped orifice, e.g., a spinneret, into a liquid coagulating bath wherein the shaped article, e.g., filamentary material is formed.

The liquid coagulant or spin-bath composition is a liquid in which the solvent employed to dissolve the polymer is soluble but in which the polymer is insoluble. Generally it is desirable to use, as the liquid coagulant, a liquid containing a lower concentration of the same solvating agent employed in making the polymer solution, said lower concentration being such that the polymer is coagulated into a gelled structure such as a sheet, film, tape, ribbon, band, rod, tube, bar, cylinder, monofilaments, multifilaments (including tow), and the like. Thus, when the solvent in which the polymer is dissolved is sulfuric acid containing at least 75%, or at least 80%, by weight of $H_2SO_4$, the liquid coagulating bath is preferably sulfuric acid having a concentration of $H_2SO_4$ lower than that of the sulfuric acid in which the polymer is dissolved and, as aforementioned, such that the solution of the polymer is coagulated into the form of a gelled structure or body.

When using the preferred liquid coagulant, i.e. aqueous sulfuric acid, the concentration of $H_2SO_4$ in said coagulant may be varied considerably depending, for example, upon the chosen polymer that is being wet-spun, the particular processing modifications and operating conditions employed, the properties desired in the final product, and other influencing factors. However, such acid concentration, especially when processing difficulty-meltable condensation polymers, e.g., wet-formable polyterephthalamides such as polyhexamethylene terephthalamide, i.e., poly(hexamethylene terephthalamide), may be below about 60% by weight of $H_2SO_4$, e.g., from 0% to 54 or 55%. By "0%" it is meant that water alone is the liquid coagulant into which the sulfuric acid solution of the polymer is extruded to form the gelled structure, the liquid coagulant then becoming acidified as it extracts this acid from the gelled structure during passage of the latter through the liquid coagulating bath.

When gelled films (especially such films which yield a transparent film as a final product) are to be prepared, the use of lower sulfuric acid concentration of the liquid coagulant, for example below about 40% $H_2SO_4$, more particularly within the range of from 0% to 30 or 35%

$H_2SO_4$, are conducive to the formation of thicker films if and when desired.

When the polymer being wet-formed from a sulfuric acid solution thereof by extrusion through an opening into a sulfuric acid coagulating bath of lower concentration than that employed in dissolving the polymer is a nylon or superpolyamide of the type exemplified by polyhexamethylene adipamide, then ordinarily the concentration of $H_2SO_4$ in the coagulating bath should be less than about 18 weight percent in order to obtain adequate coagulation of the shaped gelled structure in the spin bath. In wet-spinning such a polymer solution through an orifice to form a gelled filamentary material in the coagulating bath, the tenacity of the final dried filaments generally indicates that the optimum region of acid concentration in the bath is between about 5 and about 10% by weight of $H_2SO_4$ when one wants to obtain optimum fiber tenacity.

The temperature of the coagulating bath may be varied as desired or as may be required depending, for example, upon the particular polymer employed, the particular solvent used to dissolve the polymer, the particular liquid coagulant used, the extruson rate, the particular properties desired in the final product, and other influencing factors. Thus, the bath temperature may range, for instance, from room temperature (20°–30° C.) to about 100° C., but preferably is within the range of from about 40° C. to about 60° C. When necessary heating coils or other sources of heat may be provided in order to maintain the coagulating bath at a desired temperature above ambient temperature.

In the embodiment of the invention illustrated in FIG. 1 and which shows one technique for making filamentary material, the gelled filaments are continuously pulled through the coagulating bath. However, while in the coagulating bath the filaments are brought into contact with at least two, smooth curved surfaces which are so positioned with respect to each other, and with respect to the direction of travel of the moving filamentary material, that the said filamentary material is caused to so reverse its direction that its angle of bend is at least about 30°. Thus, the angle of bend or snubbing angle in effecting partial molecular orientation of the filamentary material in the spin bath may be within the range of from 40° or 45° to about 180°.

The smooth, curved surfaces to which reference has been made in the preceding paragraph may take the form of two rods or pins that are so positioned as to provide the aforementioned angle of bend. Such rods or pins may be formed of, or at least surfaced with, a smooth, hard, wear-resistant surface such as those that are commercially available under such names as Alsimag (and which is understood to be an aluminum magnesium silicate), Heanium (mainly $Al_2O_3$), and the like.

The rods or pins mentioned in the preceding paragraph may be disposed in the coagulating bath so that they extend vertically downwardly into the bath of liquid coagulant. Since the amount of tension imposed upon the filamentary material (for the same rod or pin diameter) is dependent upon the relative orientation of the rods, it is desirable to mount both rods upon a common head. Such a head may take the form of a fork mechanism for mounting a pair of rods as is shown in my copending application Ser. No. 233,827, filed Oct. 29, 1962, and assigned to the same assignee as the present invention. Thus, by merely rotating a shaft to which is attached a mounting head carrying the two rods in spaced relationship, the said two rods can be readily disposed at the desired angular position with regard to the direction of travel of the gelled filamentary material.

With regard to the foregoing comment concerning the amount of tension imposed upon the filamentary material by the rods or pins, it may be further mentioned that the amount or degree of tension exerted by such rods is proportional to the friction imposer upon the moving filamentary material and that the latter, in turn, depends upon the contact distance. Hence the diameter of the snubbing pin or rod is important. In the technique herein described with reference to the angle of bend or snubbing angle of the moving filaments, the diameter of the pin or rod over which the filamentary material was passed, when calculating the snubbing angle, was ¼ inch. Consequently, it is to be understood that, in the description herein given with reference to the angle of bend of the moving filamentary material, the stated angle of bend provides friction or tension corresponding to that obtained when the moving filamentary material is passed, at the specified angle of bend, over a rod or pin ¼ inch in diameter.

It is not essential that the rods or pins extend vertically downwardly into the bath of liquid coagulant. Thus, if desired, they may be positioned horizontally in the coagulating bath. Also, it is not essential that one use stationary rods or pins in the coagulating bath as tension-inducing members positioned to provide the desired angle of bend. For example, a pair of positively driven rolls may be employed in place of such rods or pins.

Partial orientation (molecular orientation) of the gelled filamentary material is provided by snubbing the said filaments in the coagulating bath in the manner just described. Further orientation of the snubbed filaments is attained by stretching them outside the coagulating bath in a gaseous fluid, specifically air at ambient temperature, for instance as is illustrated in FIGS. 1 and 2 of the accompanying drawing. As there shown, the gelled filamentary material is led out of the coagulating bath to the first of a pair of rolls and thence to the second of a pair of rolls. Both pairs of rolls are skewed so that the band of filaments (e.g., multifilamentary yarn) moves in a helical path as it passes over each pair of rolls. The second pair of rolls in the series is driven so that it revolves at a higher peripheral speed than the first. In this way the gelled filamentary material is stretched (in addition to the stretching effected by snubbing), thereby further orienting the molecules along the fiber axis as it passes between the two pairs of rolls. The overall stretch ratios obtained by snubbing in the spin bath and stretching between rolls outside the bath is usually below 4.0 and may range, for instance, from 1.2 to 3.8, more particularly from about 1.5 to about 3.5. From about ⅕ to about ⅘ of this overall stretch may be obtained by snubbing in the spin bath and the remainder by stretching between rolls outside the bath. The chosen draw or stretch ratios between the stretch rolls may be varied considerably and will depend, for example, upon the particular polymer employed, the operating conditions prior to drawing between driven rolls, including the degree of tension applied to the gelled material by snubbing in the coagulating bath, and other influencing factors.

In both FIGS. 1 and 2 of the accompanying drawing it is shown tha the snubbed and then stretched gelled filamentary material is being treated with a washing fluid, specifically hot water, as it moves in a helical path over the second pair of skewed rolls.

The washing fluid may be water alone or a combination of water and other washing fluids in different permutations. For example, an initial wash with water may be followed at a second station by an alkaline wash (e.g., a water solution of ammonia, or an aqueous solution of sodium or potassium carbonate or bicarbonate), followed by another water wash at a third station. Or, the alkaline wash may be applied first, followed by a water wash and then by a wash with a more volatile wash fluid than water, e.g., acetone, methanol, ethanol or the like. Any desired or required number of wash stations may be employed to remove the excess acid (as well as any other treating agent that may have been employed) from the gelled material, e.g., 1, 2 or 3 through 10 stations, or more, if necessary.

The washed, gelled material is dried by any suitable means either before or after collection on a take-up roll and with or without intervening processing steps or treatments (see FIGS. 1 and 2 of the drawing). In many cases, passage of the gelled structure (particularly if in film form) through air at room temperature causes the film to dry sufficiently for take-up (without sticking of contacting layers on the rolls), especially if a volatile solvent such as methanol has been applied as a final wash before take-up, and the time of exposure to air has been sufficiently long to volatilize substantially all of the solvent. Washed films also may be dried by, for example, passing the film through a drying zone while held on a support. Preferably washed, gelled filaments, sheets, films and other elongated structures of continuous (indefinite) length are dried by passage over the warm or hot (e.g., up to about 110° C.) surfaces of a heated roll. Where discoloration under heat may be objectionable, e.g., in the production of thin, transparent films, drying at an elevated temperature is preferably done in a non-oxidizing atmosphere, e.g., in nitrogen, helium, argon, etc.

If desired, the application of a washing fluid to the second pair of skewed rolls shown in FIGS. 1 and 2 of the drawing may be omitted, while continuing to operate this pair of rolls at a higher peripheral speed than the first pair in order to effect further orientation of the gelled filamentary material. Or, alternatively, instead of applying a washing fluid to remove excess sulfuric acid, the stretched filamentary material may be treated with a hot liquid acid-activating agent, e.g., polyethylene glycol, thereby to obtain a rapid and efficient transfer of heat from said agent to the aqueous sulfuric acid retained by the gelled filamentary material, and resulting in relaxation of the filaments. For additional examples of liquid acid-activating agents that may thus be used, application conditions, results obtained and related matters, reference is made to my aforementioned copending joint application with John W. Soehnger, Ser. No. 481,587, and which by this cross-reference is made a part of the disclosure of the instant application.

Instead of or in addition to washing the gelled filamentary material on skewed rolls as hereinbefore described, washing on reels may be used to remove excess acid and also any liquid acid-activating or other treating acid that may have been used. Or, one may employ a wash trough or vessel, or a series of wash troughs or vessels, through which the unwashed, gelled material passes. Preferably, the unwashed material passes countercurrently to the flow of washing fluid.

Referring now to FIG. 2 of the drawing it will be seen that the processing steps are the same in the extrusion, coagulating, snubbing, stretching and washing areas as described hereinbefore with reference to FIG. 1. In FIG. 2, however, positive drying means are shown after washing the gelled material on the second pair of skewed rolls. Any suitable type of dryer may be employed, e.g., an electrically heated slot, an electrically or otherwise heated drying oven, or the like. Any suitable drying temperature may be employed, e.g., from about 100° C. up to a temperature below the temperature at which incipient fusion of the individual filaments takes place. In other words, in the case of multifilamentary yarn the maximum drying temperature should not be so high and/or the period of time the yarn is subjected to that temperature as to cause excessive (if any) sticking together of the individual filaments, that is, to such as extent that the yarn would be unsatisfactory due to filament sticking, discoloration, etc., for further processing or for its intended use.

From the dryer the dried filamentary material is passed over a heated shoe. This shoe is provided with suitable heating means such as an electrical heating unit whereby the dried filaments can be heated sufficiently to soften them for further drawing. Drawing temperatures may range, for instance from 100° to 210° C. in the case of relatively low melting-point polyamide condensation polymers, and by which is meant specifically nylon 6,6, the most satisfactory temperature for drawing seeming to be within the range of from about 170° to about 210° C. In the case of the difficultly-meltable polymers of the kind exemplified by polyhexamethylene terephthalamide, the drawing temperature may be within the range of, for example, from 270° to 350° C., and more particularly within the range of from about 320° to about 330° C. in the case of shaped structures such as filamentary materials formed of polyhexamethylene terephthalamide (6-T polymer).

The heated, dried filamentary material after passing over the heated shoe is stretched in the area between the stretch roll positioned after the said shoe and the take-up roll. The rate of take-up is such that the yarn is under tension between the shoe and the said roll and, therefore, is stretched. The hot draw ratios will vary depending upon such influencing factors as, for example, the degree to which the filamentary or other shaped material has been softened at the particular drawing temperature, other characteristics of the particular dried, shaped polymer including the degree to which the molecules thereof previously have been oriented by snubbing and stretching, and the tenacity and other properties desired in the final product. When hot-drawing nylon filamentary material of the kind exemplified by nylon 6,6, draw ratios may range, for instance, from 1.1 to about 2.5; and with shaped difficulty-meltable polymers such as hot-drawn, filamentary 6-T polymer, the draw ratios during hot-drawing may range, for example, from 1.05 to about 1.5.

After being partly oriented by snubbing in the coagulating bath and further oriented by stretching between rolls outside the bath, the oriented gelled filamentary material may be relaxed by any suitable means in order to provide enhanced dyebath diffusion. One way of doing this is to contact the said filamentary material, before washing, with a shrinking or relaxation agent. Such an agent may be, for example when the filamentary material is formed of a difficultly-meltable polymer of the kind exemplified by 6-T polymer, an aqueous solution of sulfuric, hydrochloric or phosphoric acid in the concentrations and in the manner described in the copending application of Quynn, Jamison and Sobering, Ser. No. 464,317, filed June 16, 1965, assigned to the same assignee as the present invention, and which by this cross-reference is made a part of the disclosure of the instant application. Thus, relaxation may be effected by, for instance, contacting the filamentary material, before washing, with an aqueous solution containing, by weight, from 51 to 58%, preferably from 54 to 57%, $H_2SO_4$ for a period of at least ¼ second (e.g., from ½ second to 2 or 3 days), and at a temperature within the range of from ambient temperature to about 100° C., but usually not higher than about 90° or 95° C.

When the filamentary material is formed of a polymer of the kind exemplified by nylon 6,6, the shrinking agent may be formic acid alone or a non-halogenated solvent solution of (a) formic acid, (b) a halogenated alkanemonocarboxylic acid wherein the alkyl grouping thereof contains from 1 through 4 carbon atoms and the halogen substituent is chlorine and/or bromine, e.g., di- or trichloroacetic acid, etc., (c) hydrochloric acid, or (d) sulfuric acid. Such shrinking agents are used in the concentrations and in the manner described in Quynn, Jamison and Sobering copending application Ser. No. 487,071, filed Sept. 13, 1965, assigned to the same assignee as the present invention and which also by this cross-reference is made a part of the disclosure of the instant application. Higher concentrations of the shrinkage agents of (b), which concentrations are set forth in this last-identified Quynn et al. copending application, may be used in the relaxation-treatment of shaped structures e.g., filamentary materials, formed of a difficultly-meltable polymer of the kind exemplified by polyhexamethylene terephthalamide.

The liquid shrinking agents may be applied by immersing the shaped polymer, e.g., filaments, in an aqueous solution of the agent; by spraying or dripping the shrinking agent upon the shaped structure, e.g., continuously moving filaments when they are continuously advancing in a helical path over skewed rolls; or by brushing, padding or other conventional techniques for applying liquids to solid structures of substrates.

Whatever the means employed in relaxing the oriented filamentary material, if the relaxation treatment has been applied to the unwashed or to the washed but undried filamentary material, any acid remaining therein must be removed, as by washing, before further processing of the filamentary material, e.g., before drying. If the relaxation technique has involved the use of a liquid acid-activating agent, this agent also must be removed (as has been indicated hereinbefore), e.g., by washing with water if of the water-soluble type or by extraction with other suitable solvent if of the water-insoluble type. Generally both the excess acid and the liquid acid-activating agent (if employed) are removed at the same time by washing the shaped gelled article with a mutual solvent for the aforesaid reagents.

In order that those skilled in the art may better understand how the present invention can be carried into effect, the following examples are given by way of illustration and not by way of limitation. All parts and percentages are by weight unless otherwise stated.

Example 1

Two extrudable solutions of high molecular weight polyhexamethylene adipamide are made, one of which contains ammonium sulfate as an additive and the other does not. The polymer component of the solutions has an inherent viscosity (I.V.) of about 2.0 measured as a solution of 0.4 gram of polymer per deciliter of 97.5 sulfuric acid solvent at 25° C.

|  | Solution A | | Solution B | |
|---|---|---|---|---|
|  | Parts | Percent | Parts | Percent |
| Polymer | 52 | 13.0 | 52 | 13.0 |
| Sulfuric acid | 323 | 80.9 | 348 | 87.0 |
| Ammonium sulfate | 25 | 6.1 | Nil | Nil |

In preparing solution A the ammonium sulfate is added to the concentrated (98%) sulfuric acid at room temperature (20°–30° C.), and the mixture is stirred at the same temperature until the ammonium sulfate goes into solution. The polyhexamethylene adipamide in finely divided state is added to, and admixed with, the solution of ammonium sulfate in the sulfuric acid. Mixing is effected at about 40°–50° C., and is continued until the polymer has substantially completely dissolved, e.g., for about 2 hours. Solution B is prepared in a similar manner except that no ammonium sulfate is initially added to the concentrated sulfuric acid. Solution or dope A has a Synchro-Electric viscosity at 27° C. of 4000 poises, while the Synchro-Electric viscosity of solution B at 25° C. is 3200 poises.

Filamentary materials are made in individual runs from the above-described dopes. A dope bomb under nitrogen pressure is used in feeding the dope through a 1-inch platinum spinneret with 40 holes of 0.15 mm. diameter into a liquid coagulating bath of 8–8.5% aqueous $H_2SO_4$ at 35°–40° C. This coagulating bath is circulated through a rectangular trough formed of acid-resistant material by an external Jabsco pump equipped with a by-pass. Constant temperature in the coagulating bath is maintained with a glass-enclosed electric heater and a glass-enclosed thermoregulator.

Snubbing pins for effecting at least partial orientation of the gelled filamentary material are inserted in the bath at a distance of 38 inches from the face of the spinneret. The pins are comprised of a pair of Alsimag rods, ¼-inch in diameter, over which the yarn is snubbed before removal from the spin bath. They are held in a 2-hole rubber stopper at a distance of ⅝-inch between centers. The stopper is rotated to provide the desired snubbing angle. The yarn is dragged against portions of the surfaces of these rods in a partial reversion of direction before withdrawal from the bath.

After withdrawal from the bath the snubbed, partially molecularly oriented, gelled yarn is stretched in air between two pairs of yarn-advancing, skewed rolls as indicated in FIGS. 1 and 2 of the accompanying drawing. The gelled yarn is washed with hot water on the second pair of rolls, which are driven at a higher peripheral speed than the first pair in order to attain the desired degree of stretch. The yarn, after passing through a traverse device, is then taken upon a perforated take-up bobbin where it is wound at the rate of 30 meters per minute, the same speed as the second pair of skewed rolls. The yarn on the bobbin is washed with running tap water for about 16 hours to free it of residual acid, and is then allowed to dry in air at room temperature (20°–30° C.).

The snubbing pins to which reference has been made hereinbefore are introduced vertically in the spin bath from above.

The specific conditions of wet-spinning solutions A and B together with fiber properties are given in Table I. The "Stretch Ratio" in one of the column headings refers to the stretch or draw ratio between the driven rolls positioned outside the stretch bath.

It is to be noted that in spinning solution A more severe orienting conditions could be imposed as compared with that of solution B; that these conditions could be maintained stably for solution A; and that, as compared with the spinning of solution B, the dried filaments spun from solution A were markedly superior in their fiber properties. It is also pointed out that, in one run with solution B wherein snubbing in the spin bath was omitted and the stretch ratio between the driven rolls outside the bath was 1.7, there was a marked increase in the tensile strength of the dried fibers when the gelled yarn was snubbed in the bath using a snubbing angle of 100° and the same stretch ratio of 1.7. This increase in tenacity was 75% (1.4 vs. 0.8 g./d.). The comparative data obtained in wet-spinning solutions A and B also shows the marked advantages secured by including in the spinning solution a salt which yields ions in solution that have an affinity for protons at least equal to that of bisulfate ions, and of which salts th additive employed in this example, i.e., ammonium sulfate, is typical.

TABLE I OF EXAMPLE 1

|  | Bath conc., percent $H_2SO_4$ | Bath temp., °C. | Snub angle, degrees | Stretch ratio | Denier | Tension, g./d. | Elongation, percent | TE$^{1/2}$ |
|---|---|---|---|---|---|---|---|---|
| Spinning of solution A | 8.0 | 40 | 100 | 2.5 | 3.7 | 1.8 | 88 | 17.2 |
|  | 8.0 | 37 | 110 | 2.5 | 3.3 | 2.3 | 76 | 19.5 |
|  | 8.5 | 35 | 120 | 2.5 | 3.7 | 2.1 | 76 | 18.4 |
| Spinning of solution B | 8.5 | 39 | None | 1.7 | 4.2 | 0.8 | 123 | 9.0 |
|  | 8.0 | 34 | 100 | ¹ 1.7 | 2.4 | 1.4 | 94 | 13.6 |

¹ Maximum attainable stretch ratio at this snubbing angle.

Example 2

This example illustrates the additional improvement

Details of the operating conditions and of the fiber properties are given in Table III which follows.

TABLE III OF EXAMPLE 3

|  | Bath conc., percent H2SO4 | Bath temp., °C. | Take-up speed, m./min. | Snub angle, degrees | Stretch ratio | Denier | Tension, g./d. | Elongation, percent | TE1/2 |
|---|---|---|---|---|---|---|---|---|---|
| Jet: 1-inch x 10-hole x 0.100 mm | 2.2 | 22 | 39 | 120 | 2.4 | 1.5 | 3.1 | 46 | 20.7 |
|  | 2.3 | 22 | 39 | None | 2.4 | 2.6 | 2.1 | 93 | 19.9 |
|  | 2.4 | 25 | 40 | None | 2.5 | 3.2 | 1.8 | 86 | 16.7 |
|  | 0 | 24 | 29 | 180 | 1.4 | 2.8 | 2.4 | 62 | 18.9 |
|  | 0 | 44 | 29 | 180 | 1.4 | 6.8 | 1.2 | 69 | 10.3 |
|  | 0 | 47 | 34 | 180 | 1.6 | 3.2 | 1.7 | 56 | 12.8 |
| Jet: 1-inch x 40-hole x 0.100 mm | 7 | 26 | 30 | 70 | 1.7 | 1.2 | 2.1 | 107 | 21.4 |
|  | 7 | 26 | 30 | 70 | 1.7 | 1.6 | 2.0 | 106 | 20.0 |
|  | 7 | 25 | 30 | 70 | 1.7 | 1.6 | 1.9 | 129 | 21.1 |
|  | 7 | 25 | 30 | 90 | 2.5 | 2.0 | 2.5 | 71 | 21.0 |
|  | 7 | 25 | 30 | 120 | 2.5 | 2.0 | 2.8 | 60 | 21.5 |
|  | 8 | 22 | 30 | 120 | 2.5 | 2.4 | 2.5 | 56 | 18.8 | in physical properties that is obtained when dried yarns of the first and third spinning runs with solution A are hot-stretched over a metal surface heated to 180° C. The draw or stretch ratio is 1.5 and the drawing sped is 20 meters per minute. The fiber properties are given in Table II which follows. It will be noted that there is an increase in tenacity ranging from about 74% (4.0 vs. 2.3 g./d.) to about 111% (3.8 vs. 1.8 g./d.) between the hot-drawn yarns and the dried "as spun" yarns.

TABLE II

|  | Denier | Tension, g./d. | Elongation, percent | TE1/2 |
|---|---|---|---|---|
| As-spun fiber | 3.7 | 1.8 | 88 | 17.2 |
| Drawn fiber | 2.1 | 3.8 | 18 | 16.2 |
| As-spun fiber | 3.3 | 2.3 | 76 | 19.5 |
| Drawn fiber | 2.2 | 4.0 | 20 | 18.0 |

Example 3

This example illustrates the wet-spinning of nylon 6,6 polymer solutions similar to that of solution A of Example 1 but having viscosities at 25° C. within the range of from 2700 to 3000 poises using both 10-hole and 40-hole spinnerets having openings 0.100 mm. in diameter. In some cases water alone is employed as a coagulant; in others, the liquid coagulant is aqueous sulfuric acid having a concentration of H2SO4 of less than 8% in all but one instance. Bath temperatures are varied from 22° to 47° C., snubbing angles from 0° to 180°, and stretch ratios of the driven rolls outside the coagulating bath, from 1.4 to 2.5. It is particularly to be noted that, when snubbing in the spin bath is omitted and at stretch ratios of either 2.4 or 2.5, the tenacity of the dried yarn ranges from 1.8 to 2.1 g./d. In marked contrast the tenacity is increased from about 48% (3.1 vs. 2.1 g./d.) to about 72% (3.1 vs. 1.8 g./d.) when the gelled filamentary material is snubbed at a 120° angle in the spin bath followed by stretching in air between driven rolls outside the spin bath at a stretch ratio of 2.4. Such increases in tenacity due to a combination of snubbing (tensioning) in the spin bath and stretching between rolls outside the bath were entirely unobvious and in no way could have been predicted from the teachings of the prior art in the area of this invention.

Example 4

This example is an amplification of what is indicated by Example 2 with regard to the further improvement in tenacity that is obtained by hot-drawing dried, wet-spun polyhexamethylene adipamide filamentary material that has been previously molecularly oriented by a combination of snubbing in the spin bath followed by stretching between rolls outside the spin bath. The dried yarn is prepared from nylon 6,6 polymer in essentially the same manner as described in Examples 1 and 3. Some of the yarns are hand-drawn while others are hot-drawn as described in Example 2. Drawing temperatures employed in this example range from 100° to 220° C. The optimum drawing temperature appears to be in the range of from 170° to 210° C. A marked improvement in tenacity between the hot-drawn yarn and the dried yarn before hot-drawing is apparent in all cases. The results are summarized in Table IV.

TABLE IV OF EXAMPLE 4

|  | Draw Temp., °C | Draw Ratio | Draw Speed m./min. | Denier | Tension, g./d. | Elongation, Percent | TE 1/2 |
|---|---|---|---|---|---|---|---|
| Dried yarn before hot-drawing |  |  |  | 2.0 | 2.1 | 76 | 18.1 |
| Hand drawn | 100 |  |  | 1.3 | 3.5 | 17 | 14.0 |
| Do | 150 |  |  | 1.1 | 4.3 | 18 | 18.2 |
| Do | 170 |  |  | 1.1 | 4.8 | 11 | 16.2 |
| Do | 180 |  |  | 1.1 | 5.1 | 11 | 17.3 |
| Dried yarn before hot-drawing |  |  |  | 1.5 | 3.1 | 46 | 20.7 |
| Hand drawn | 180 |  |  | 1.0 | 5.2 | 13 | 19.0 |
| Do | 210 |  |  | 1.2 | 4.4 | 22 | 20.6 |
| Do | 220 |  |  | 1.1 | 4.7 | 18 | 20.0 |
| Dried yarn before hot-drawing |  |  |  | 2.0 | 2.8 | 60 | 21.5 |
| Do | 150 | 2.0 | 13 | 1.7 | 3.2 | 41 | 20.7 |
| Do | 180 | 1.75 | 13 | 1.4 | 4.6 | 19 | 20.1 |
| Do | 210 | 1.75 | 13 | 1.4 | 4.5 | 18 | 19.1 |

Example 5

This illustrates the results of a series of runs to produce wet-spun yarn from a difficultly- meltable, linear, condensation polymer, specifically from polyhexamethylene terephthalamides having I.V.'s ranging from 1.25 to 2.04. The spinning dopes are made by dissolving the individual polymers in 98% sulfuric acid to which has been added about 5% of ammonium sulfate. The method of dissolution and basic operating steps are essentially the same as described under Example 1 and in the portion of this specification prior to the examples.

The concentration of polymer in the dope is varied from 11.0 to 13.8%. Jets with hole diameters of either 0.10 or 0.15 mm. are used. The liquid coagulating bath is aqueous sulfuric acid, the concentration of which is varied from 47.1 to 49.2% H2SO4. The length of the bath is about 1 meter, and it is maintained at a temperature of about 50° C. The gelled filamentary material, before leaving the bath, is led over snubbing pins inserted in the bath as hereinbefore described with reference to Examples 1 and 3. The snubbing angle is varied from 45° to 100°. In most cases comparative runs are made in which (1) there is no after-stretching of the gelled, snubbed filaments after leaving the spin bath enroute to a pair of skewed rolls, and (2) wherein the said gelled filaments are after-streached by increasing the takeup speed between the said skewed rolls and the take-up roll. More particularly, the stretch or draw ratios are varied from 1.0 ,i.e., no after-stretch) to 1.67. Details of the operating conditions and properties of the dried yarn are given in Table V.

dried product of run 6–a is a narrow, but still, flat band. It is about 1 mm. wide, with from about 5 to 10 layers folded over. In marked contrast, the dried product of run 6–b is tightly coiled, irreversible, and is in the form of an actual monofilament.

From the foregoing examples and discussion, and the description prior to the examples, it will be seen that the invention provides unobvious results not attainable

TABLE V OF EXAMPLE 5.—SPINNING OF YARNS FROM POLYHEXAMETHYLENE TEREPHTHALAMIDE

| Run No. | Polymer I.V. | Polymer conc. in dope, percent | Diam. of jet holes, mm. | Acid conc. of bath, percent | Snubbing angle, degrees | First roll speed, m./min. | Take-up speed, m./min. | Denier | Tension, g./d. | Elongation, percent |
|---|---|---|---|---|---|---|---|---|---|---|
| 5–1–a | 1.38 | 13.8 | 0.10 | 47.8 | 65 | 51 | 55 | 1.6 | 3.7 | 25 |
| 5–1–b | 1.38 | 13.8 | 0.10 | 47.8 | 65 | 51 | 60 | 1.8 | 4.2 | 19 |
| 5–2–a | 1.25 | 14.5 | 0.10 | 47.1 | 45 | 70 | 70 | 2.6 | 2.2 | 22 |
| 5–2–b | 1.25 | 14.5 | 0.10 | 47.1 | 45 | 70 | 80 | 2.3 | 2.7 | 27 |
| 5–3–a | 2.04 | 12.0 | 0.15 | 47.9 | 50 | 15 | 25 | 4.5 | 5.8 | 11 |
| 5–3–b | 2.04 | 12.0 | 0.15 | 48.3 | 50 | 20 | 25 | 4.8 | 4.6 | 21 |
| 5–3–c | 2.04 | 12.0 | 0.15 | 48.5 | 50 | 20 | 30 | 3.4 | 6.2 | 15 |
| 5–4–a | 1.96 | 11.5 | 0.10 | 49.2 | 70 | 30 | 30 | 2.0 | 4.9 | 24 |
| 5–4–b | 1.96 | 11.5 | 0.10 | 49.2 | 70 | 30 | 33 | 1.9 | 6.0 | 25 |
| 5–5–a | 1.96 | 11.5 | 0.10 | 49.1 | 70 | 30 | 30 | 1.9 | 5.1 | 25 |
| 5–5–b | 1.96 | 11.5 | 0.10 | 49.1 | 70 | 30 | 35 | 2.1 | 5.8 | 23 |
| 5–6–a | 1.9 | 11.0 | 0.15 | 48.5 | 100 | 30 | 30 | 5.3 | 6.4 | 19 |
| 5–6–b | 1.9 | 11.0 | 0.15 | 48.5 | 100 | 30 | 34 | 5.2 | 7.1 | 17 |

Comparing the runs of 5–2–a with 5–2–b it will be noted that an after-stretch, following snubbing, at a draw ratio of 1.14 results in an increase in tenacity (as compared with no snubbing) of about 22.7% (2.7 vs. 2.2 g./d.). A similar comparison between runs 5–4–a and 5–4–b wherein the after-stretch was at a draw ratio of 1.10 provides an increase in tenacity of about 20.4% (6.0 vs. 5.4 g./d.). Similarly compared runs 5–5–a and 5–5–b at an after-stretch draw ratio of about 1.17 shows an increase in tenacity of about 13.7% (5.8 vs. 5.1 g./d.). When runs 5–6–a and 5–6–b are similarly compared, it will be noted that an after-stretch at a draw ratio of about 1.13 gives an increase in tenacity of about 10.9% (7.1 vs. 6.4 g./d.). A comparison of runs 5–1–a and –b and of runs 5–3–a, –b and –c shows the effect of variations of the after-stretch draw ratio, while maintaining constant the angle of snubbing, upon the tenacity and elongation characteristics of the dried yarn.

Example 6

This example illustrates other unobvious results obtained by practicing the present invention, more particularly in the extrusion of a solution of polyhexamethylene terephthalamide (6–T) through a slot, using snubbing alone in one run and a combination of snubbing and stretching in another run.

The general conditions are the same as described, with reference to Example 1, in the portion of Example 5 prior to Table 5. The 6–T polymer has an I.V. of 1.9. The dope contains 11.0% of 6–T polymer, and is extruded through a horizontal slot 51 x 0.18 mm. into a 50° C. coagulating bath consisting of aqueous sulfuric acid containing 50.3% $H_2SO_4$. In run 6–a snubbing alone is used, while in run 6–b both snubbing and an after-stretch are employed. In both runs the first roll speed is 31 meters per minute. In run 6–a the take-up speed is also 31 meters per minute; that is, no after-stretch is applied and the draw ratio is 1.0. In run 6–b the take-up speed is 55 meters per minute, and therefore the draw ratio is about 1.77. The comparative physical properties are tabulated below.

| | Denier | Tenacity, g./d. | Elongation, percent |
|---|---|---|---|
| Product of Run No.: | | | |
| 6–a | 359 | 1.1 | 110 |
| 6–b | 190 | 2.0 | 47 |

From the foregoing it will be noted that the combination of snubbing and stretching provides an increase in tenacity of approximately 81.8% as compared with snubbing alone. The appearance of the dried products of the respective runs is even more striking and unobvious. The either by snubbing in the spin bath alone or by wet-stretching between rolls outside the stretch bath alone in order to effect molecular orientation of the shaped structure. Although orientation of filamentary materials by snubbing alone in the spin bath can result in the production of high-tenacity yarns from particular polymers, as shown by way of illustration in Example 7 that follows, such technique often has certain inherent practical disadvantages that are not present in a process wherein orientation is effected by a combination of snubbing in the spin bath and after-stretching outside the bath.

For example, when maximum stretch or molecular orientation is desired to be obtained such as would require more than 180° twist of the snubbing pins, the string-up of the gelled yarn in the spin bath becomes more complicated and a greater amount of filament breakage occurs or may tend to occur, due to the greater frictional resistance encountered by the yarn while it is still insufficiently strong for such handling. When excessive filament breakage takes place in the spin bath, re-stringing of the yarn becomes a messy job, may result in accidental acid burns to the operators, and also tends to result in a work area which becomes splashed with spin-bath liquor. Additionally, short lengths of broken-off filamentary material that are not promptly removed from the spin bath contaminate the bath, may adhere or tend to adhere to the re-threaded yarn, and cause additional complications in later processing steps.

Such difficulties are obviated or minimized by the present invention which additionally provides greater process flexibility. By practicing this invention it is not necessary to attain or endeavor to attain maximum orientation by snubbing alone. By effecting only partial orientation in the spin bath by snubbing, filament breakage at this stage of the process is minimized. By effecting further or maximum orientation by wet-stretching outside the spin bath, it is easier for the operator to handle and dispose of the broken yarn and to re-thread the unit, if the latter should be necessary.

Another advantage attained by effecting partial orientation by snubbing in the spin bath is due to the fact that the tensile strength of the gelled yarn is built up more gradually with the result that it is better enabled to withstand more vigorous handling such as it encounters in passing outside the spin bath to the first pair of driven rolls. Consequently, the present invention makes it possible to wet-spin into filaments those potentially filamentary-forming polymers that one would not otherwise be able to convert into wet-spun filaments because of their excessively weak structure in their freshly spun state.

Thus, the present invention makes it possible to secure certain of the advantages flowing from snubbing alone

17 in the spin bath and those accruing from after-stretching outside the spin bath, while obviating or minimizing the disadvantages of each. For instance, by having the ultimate 20–80% of total tensioning or stretch (i.e., 20–80% of the total molecular orientation) take place outside the spin bath, control of the operation is easier and repairs that are necessary because of filament breakage or for other reasons in order to maintain steady-state operating conditions can be made more readily.

The following example, to which reference has been made in the third paragraph immediately preceding, does not avoid the inherent practical disadvantages just discussed in the use of snubbing alone in the spin bath to effect molecular orientation of a wet-spun 6–T polymer. However, it does show that, when the polymer itself has superior properties, it is possible by such means to obtain, for example, 6 d./fil. fiber of 6–T having a tenacity in excess of 8 g./d. and which can be increased to 10 g./d. by hot-drawing the dried filaments.

Example 7

Runs are made using basically the same apparatus and general procedure employed in Examples 1, 3 and 5, in wet-spinning two different samples of polyhexamethylene terephthalamide. The spinning dope contains 10.5–10.8% polymer dissolved in 98% $H_2SO_4$ to which has been added 7% ammonium sulfate. The coagulating bath, which is maintained at 50° C., consists of aqueous sulfuric acid containing 49±0.3% $H_2SO_4$. The spinning speed is 30 meters per minute. Additional details on the polymer, the snubbing angle and the properties of the dried yarn are given in Table VI.

18 two pairs of skewed rolls as illustrated in FIGS. 1 and 2 of the accompanying drawing, and previously described in Examples 1 and 3 with reference to that drawing. The darw ratio is about 1.14. The snubbed and stretched yarn is washed to remove residual acid and air-dried. When the dried fiber is tested for tenacity, the average of several similar runs is about 5% higher htan the 8.1 g./den. of the yarn from Run 3 of Example 7.

The tenacities of the snubbed only or snubbed and stretched yarns of Examples 7 and 8 may be further increased by hot-drawing. For instance, yarns of the various runs of Example 7 have been hot-drawn at a drawing speed of 12 meters per minute vs. a feed speed of about 10 meters per minute, i.e., at a draw ration about of 1.2. (This low speed was necessitated by the relatively small quantity of test yarn available.) The yarn was drawn over a hot shoe heated to about 320°–330° C. Under these conditions a maximum tenacity on the hot-drawn fiber of about 10.4 g./d. was obtained, while the percent elongation was in the range of from 9.5 to 10.5%. Hot-drawing was done both in air and under a nitrogen atmosphere to exclude oxygen from the vicinity of the hot shoe. The tenacities when the yarn was drawn in air where only slightly lower (if at all) than when hot-drawn under a nitrogen atmosphere.

From the foregoing description it will be seen that the present invention provides a method of producing shaped structures such as filaments, films and the like from a filament- and/or film-forming condensation polymer containing nitrogen and/or oxygen atoms as an integral part of the polymer chain and having an inherent

TABLE VI OF EXAMPLE 7

| Run No. | Polymer 6–T Sample No. | I.V. | P.V.* | Snubbing Angle, degrees | Denier | Tension, g./d. | Elongation, percent | TE½ |
|---|---|---|---|---|---|---|---|---|
| 1 | L–305 | 2.1 | 2.6 | 65 | 5.3 | 8.0 | 16 | 32 |
| 2 | L–305 | 2.1 | 2.6 | 100 | 5.5 | 7.6 | 16 | 31 |
| 3 | L–305 | 2.1 | 2.6 | 60 | 6.1 | 8.1 | 16 | 32 |
| 4 | L–306 | 2.1 | 2.4 | 80 | 4.3 | 7.6 | 15 | 30 |
| 5 | L–306 | 2.1 | 2.4 | 80 | 5.3 | 7.6 | 19 | 33 |
| 6 | L–306 | 2.1 | 2.4 | 80 | 5.1 | 7.9 | 18 | 34 |

* P.V.=plugging value.

An indication of the ability of a polymer to be formed into a shaped article such as a filament of desirable properties is its "plugging value," which is inversely related to the tendency of a solution of the polymer to plug the pores of a filter. The plugging value may be determined, for example, by filtering a dilute solution of the polymer through a standard filtering medium at standard conditions of pressure drop and temperature, measuring the volume of the filtrate at definite time intervals, plotting $t/V$ as the ordinate against $t$ as the abscissa where $t$ is the time and V the corresponding volume of filtrate, multiplying the reciprocal of the slope of the resulting straight line by the polymer concentration and dividing by the area of the filter. The units may be chosen so that the plugging value is given in grams per square centimeter.

In some instances, a plot of $t/V$ versus $t$ does not yield a continuous straight line. In these cases, the plugging value is determined by plotting points of $t/V$ versus $t$ for a substantial degree of plugging, e.g., over 50%, and drawing the best straight line through the points representing the highest degree of plugging. The plugging value is then calculated from the slope of this line as described above.

Example 8

Run 3 of Example 7 is repeated with the exception that, instead of using a snubbing angle of 65°, there is employed a snubbing angle of 50° thereby to effect only partial molecular orientation of the gelled filamentary material along the fiber axis. Further orientation is effected by stretching the snubbed yarn in air between viscosity of at least 1.2, preferably at least 1.5. In its broader aspects the method comprises:

(A) Extruding a solvent solution of the aforesaid polymer through a shaped orifice of predetermined cross-section into a liquid coagulating bath in which the solvent employed to disolve the said polymer is soluble but the polymer is insoluble thereby to obtain a gelled, elongated structure of continuous length;

(B) Increasing the tenacity of the dried, elongated structure by (a) effecting partial molecular orientation of the gelled, elongated structure by tensioning the said structure in the coagulating bath by means of snubbing, and
(b) effecting further molecular orientation of the said structure by wet-stretching it outside the coagulating bath.

The overall stretch applied outside the coagulating bath is from about ⅕ to about ⅘, more particularly from about ⅓ to ⅔, e.g., from 0.4 to 0.6, of the overall stretch obtained by a combination of snubbing the gelled, elongated structure inside the coagulating bath and by stretching it, e.g., between driven rolls in air, outside the said bath. The gelled structure is dried subsequent to Step B as previously has been described.

The inherent viscosities referred to throughout the foregoing specification and in the following claims represent the function $$\ln \eta_{rel}/c$$

at 25° C. and 0.4% polymer concentration of a solution of the polymer in 97.5% $H_2SO_4$, where $\eta_{rel}$ is the relative viscosity of the solution at 25° C., i.e., the ratio of the viscosity of the polymer solution to the viscosity of the solvent acid, and $c$ is the polymer concentration expressed as percentage ratio of polymer weight in grams to acid volume in cubic centimeters. The inherent viscosity (I.V.) is thus expressed in units of deciliters per gram.

Instead of using polyhexamethylene adipamide or polyhexamethylene terephthalamide in making dope solutions from which are produced filamentary materials and other shaped structures in accordance with the present invention, one may use mixtures of these polyamides in any proportions. Or, one may use epsilon-caprolactam (i.e., nylon 6), other poly(polymethylene) amides of dicarboxylic acids containing from 2 to 10 carbon atoms, inclusive, in the polymethylene group, e.g., polyhexamethylene sebacamide, polytetramethylen adipamide and others of which numerous illustrations have been given in the portion of this specification prior to the working examples. Or, instead of using a difficultly-meltable polymer such as polyhexamethylene terephthalamide, one may employ, for instance, the polyisophthalamides, e.g., polyethylene isophthalamide, polyhexamethylene isophthalamide, or any of the other difficultly-meltable polymers containing nitrogen and/or oxygen atoms as an integral part of the polymer molecule, numerous examples of which previously have been given.

It is to be understood that the foregoing detailed description is given merely by way of illustration, and that many variations may be made therein without departing from the spirit of the invention.

What is claimed is:

1. A process for producing a continuous filament of polyhexamethylene adipamide from polyhexamethylene adipamide having an inherent viscosity of at least 1.5 which comprises extruding an aqueous solvent solution of said polymer in at least 75% by weight sulfuric acid through a filament-forming shaped opening into a liquid coagulating bath of aqueous sulfuric acid having a concentration less than about 18 weight percent of $H_2SO_4$ and in which the polymer is insoluble thereby to obtain a gelled elongated structure of continuous length, increasing the tenacity of the dried, elongated structure by stretching in the wet state a total overall draw of about 1.5 to about 3.5 times wherein said wet state stretching comprises a partial molecular orientation of the gelled, elongated structure by tensioning the structure in the coagulating bath by means of snubbing and effecting a furthermolecular orientation of said structure by wet-stretching it outside of said coagulating bath in a gaseous environment, the stretch applied outside of said bath being from about ⅕ to about ⅘ of the overall stretch obtained by a combination of snubbing in the coagulating bath and by stretching it outside of said bath, drying said structure and subsequently hot drawing at a temperature of 100 to 210° C. in an amount of 1.1 to 2.5 times.

2. A process for producing shaped condensation polyamide structures wherein said polyamide is selected from the class consisting of polyhexamethylene adipamide and polyhexamethylene terephthalamide comprising extruding a solvent solution of said condensation polyamide having an inherent viscosity of at least 1.2, said solvent being selected from the group consisting of aqueous sulfuric acid containing at least 75% by weight sulfuric acid, aqueous phosphoric acid containing at least 85% by weight of phosphoric acid and a solution of antimony trichloride containing at least 70% by weight of antimony trichloride and up to 30% by weight of formic acid or acetic acid as a diluent, through a shaped opening of predetermined cross-section into a liquid coagulating bath in which the solvent employed to dissolve said polymer is soluble, but the polymer is insoluble thereby to obtain a gelled elongated structure of continuous length, said coagulating bath being of the same composition as said solvent but in a concentration lower than that of said solvent; increasing the tenacity of the dried, elongated structure by stretching in the wet state a total overall draw of about 1.5 to about 3.5 times wherein said wet state streching comprises a partial molecular orientation of the gelled, elongated structure by tensioning the structure in the coagulating bath by means of snubbing and effecting a further molecular orientation of said structure by wet-stretching it outside of said coagulating bath in a gaseous environment, the stretch applied outside of said bath being from about ⅕ to about ⅘ of the overall stretch obtained by a combination of snubbing in the coagulating bath and by stretching it outside of said bath, drying said structure and subsequently hot drawing at a temperature of 270 to 350° C. in an amount of 1.05 to 1.5 times for said polyhexamethylene terephthalamide and at a temperature of 100 to 210° C. and in an amount of 1.1 to 2.5 times for said polyhexamethylene adipamide.

3. The method of claim 2 wherein the shaped structure is a filament.

4. The method as in claim 3 wherein the condensation polymer has an inherent viscosity of at least 1.5; the solvent in which the said polymer is dissolved in sulfuric acid containing at least 75% by weight of $H_2SO_4$; and the liquid coagulating bath into which the said solution is extruded is aqueous sulfuric acid having a concentration lower than that of the sulfuric acid in which the polymer is dissolved and such that the solution is coagulated into the form of a gelled, elongated structure of continuous length.

5. The method as in claim 3 wheerin the solvent in which the condensation polymer is dissolved is sulfuric acid containing at least 80% by weight of sulfuric acid and from 1 to 15%, based on the weight of the said solvent, of a salt selected from the group consisting of ammonium sulfates, alkali-metal sulfates, ammonium phosphates and alkali-metal phosphates.

6. The method as in claim 5 wherein the said salt is ammonium sulfate.

7. The method as in claim 4 wherein the linear condensation polyamide is a poly(hexamethylene) terephthalamide having an inherent viscosity of at least 1.5; and the liquid coagulating bath into which the sulfuric acid solution of the said polyamide is extruded is water or aqueous sulfuric acid having a concentration less than about 60 weight percent of $H_2SO_4$.

8. The method as in claim 4 wherein the polyamide is poly(hexamethylene) terephthalamide; and the liquid coagulating bath into which the sulfuric acid solution of said polyamide is extruded is aqueous sulfuric acid containing up to 55 weight percent of $H_2SO_4$.

9. The method of claim 3 wherein the polymer is polyhexamethylene adipamide and the hot drawing is effected at a temperature of 170 to 210° C.

10. The method of claim 3 wherein the polymer is polyhexamethylene terephthalamide and the hot drawing is effected at a temperature of from 270 to 350° C.

References Cited

UNITED STATES PATENTS

| | | | |
|---|---|---|---|
| 3,079,219 | 2/1963 | King | 264—184 |
| 3,154,609 | 10/1964 | Cipriani | 264—184 |
| 3,154,610 | 10/1964 | Deynes | 264—184 |
| 3,154,612 | 10/1964 | Parczewski | 264—184 |
| 3,154,613 | 10/1964 | Epstein | 264—184 |
| 3,179,618 | 4/1965 | Roberts | 264—184 |
| 3,227,793 | 1/1966 | Cipriani | 264—210 |
| 3,389,206 | 6/1968 | Jamison | 264—203 |
| 3,399,261 | 8/1968 | Nakayama et al. | 264—184 |
| 3,414,645 | 12/1968 | Morgan | 264—184 |

JULIUS FROME, Primary Examiner

H. MINTZ, Assistant Examiner

U.S. Cl. X.R.

264—203, 210, 288, 290, 342; 260—78

UNITED STATES PATENT OFFICE
CERTIFICATE OF CORRECTION

Patent No. 3,574,811      Dated April 13, 1971

Inventor(s) Saunders E. Jamison      PAGE - 1

It is certified that error appears in the above-identified patent and that said Letters Patent are hereby corrected as shown below:

Column 1, line 63, after the word "articles" insert -- i.e., articles--.

Column 2, line 13, the word "preferable" should be -- preferably--.

Column 3, line 24, the words "thin-forming" should be --film-forming--.

Column 3, line 36, the word "inpention" should be -- invention--.

Column 4, lines 17 and 18, the word "(p,p'-dicarboxydiphenly)" should read --(p,p'-dicarboxydiphenyl)--.

Column 7, line 23, the word "extruson" should be --extrusion--.

Column 7, line 75, the word "imposer" should be -- imposed --.

Column 8, line 56, the word "tha" should be --that--.

Column 9, line 37, the name "Soehnger" should be -- Soehngen --.

Column 9, line 65, the word "as" should be -- an --.

Column 11, line 36, after the number "97.5" insert -- % --.

Column 13, line 21, the word "sped" should be -- speed --.

Column 14, line 54, after the word "This" insert -- example --.

Column 15, line 5, after "1.0," insert -- ( --.

Column 16, line 4, the word "irreversible" should be--irreversibly--.

Column 18, line 7, the word "htan" should be -- than --.

UNITED STATES PATENT OFFICE
CERTIFICATE OF CORRECTION

Patent No. 3,574,811           Dated April 13, 1971

Inventor(s) Saunders E. Jamison       PAGE - 2

It is certified that error appears in the above-identified patent and that said Letters Patent are hereby corrected as shown below:

Column 19, line 16, the word "polytetramethylen" should be -- polytetramethylene--.

Claim 1, line 17, "furthermolecular" should be written --further molecular --.

Claim 5, line 1, the word "wheerin" should be -- wherein --.

Claim 9, line 2, the word "adipamide" should be -- terephthalamide --.

Signed and sealed this 18th day of January 1972.

(SEAL)
Attest:

EDWARD M. FLETCHER, JR.
Attesting Officer

ROBERT GOTTSCHALK
Acting Commissioner of Patents